United States Patent
Park et al.

(10) Patent No.: US 8,962,193 B2
(45) Date of Patent: Feb. 24, 2015

(54) ELECTROCHEMICAL CELL WITH SOLID ELECTROLYTE HAVING ALUMINA EDGE PORTION

(75) Inventors: Hyun-Ki Park, Yongin-si (KR); Dong-Hee Han, Yongin-si (KR); Jeong-Doo Yi, Yongin-si (KR); Ju-Yong Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 643 days.

(21) Appl. No.: 13/218,310

(22) Filed: Aug. 25, 2011

(65) Prior Publication Data

US 2012/0164540 A1    Jun. 28, 2012

Related U.S. Application Data

(60) Provisional application No. 61/426,484, filed on Dec. 22, 2010.

(51) Int. Cl.
*H01M 6/18*    (2006.01)
*H01M 10/39*    (2006.01)
*H01M 10/054*    (2010.01)
*H01M 10/0562*    (2010.01)

(52) U.S. Cl.
CPC ........ *H01M 10/3918* (2013.01); *H01M 10/054* (2013.01); *H01M 10/0562* (2013.01); *H01M 10/3927* (2013.01); *H01M 2300/0088* (2013.01); *H01M 2300/0091* (2013.01)
USPC ............................. 429/320; 429/188; 429/304

(58) Field of Classification Search
USPC .......................................... 429/188, 304, 320
See application file for complete search history.

(56) References Cited

U.S. PATENT DOCUMENTS

| 3,985,576 | A | * | 10/1976 | Lingscheit et al. | ........... 429/103 |
| 4,035,553 | A | * | 7/1977 | Evans et al. | ................... 429/104 |
| 4,294,897 | A | | 10/1981 | Bindin | |
| 2009/0011331 | A1 | | 1/2009 | Stringer et al. | |
| 2011/0236743 | A1 | * | 9/2011 | Kumar et al. | ................. 429/144 |

FOREIGN PATENT DOCUMENTS

| JP | 06-260210 | 9/1994 |
| JP | 09-326261 | 12/1997 |
| JP | 3599682 B | 9/2004 |
| KR | 10-2002-0038210 A | 5/2002 |

OTHER PUBLICATIONS

Machine English Translation of JP 3599682 B, (Sep. 2004).
Machine English Translation of JP 09-326261, (Dec. 1997).
Machine English Translation of JP 06-260210, (Sep. 1994).

* cited by examiner

*Primary Examiner* — Zachary Best
(74) *Attorney, Agent, or Firm* — Christie, Parker & Hale, LLP

(57) ABSTRACT

A solid electrolyte is disclosed. The solid electrolyte includes a main portion that includes β-alumina or β"-alumina, and an edge portion integrally provided with the main portion. The edge portion has a mixed portion that includes α-alumina and includes β alumina or β"-alumina. A concentration gradient of the α-alumina in the edge portion decreases in a first direction from the edge portion to the main portion.

10 Claims, 5 Drawing Sheets

ELECTROCHEMICAL CELL WITH SOLID ELECTROLYTE HAVING ALUMINA EDGE PORTION

CROSS-REFERENCE TO RELATED APPLICATION

This application claims priority to and the benefit of U.S. Provisional Application No. 61/426,484, filed on Dec. 22, 2010, the entire content of which is incorporated herein by reference.

BACKGROUND

1. Field

Aspects of embodiments according to the present invention relate to an electrochemical cell.

2. Description of Related Art

Research into sodium-based electrochemical cells for storing electric power that is generated for household use, electric power that is generated by solar power, and electric power that is generated by wind power and for supplying electric power to electric vehicles is continuing. Electrochemical cells, such as a sodium-chloride nickel cell and a NaS cell, are large-capacity cells that store between a few kW to a few MW of electric power and have high-energy densities and a long lifetime. Due to these characteristics, they are used in a wide range of applications.

SUMMARY

Aspects of embodiments according to the present invention are directed in general toward an electrochemical cell and in particular toward the joint between a solid electrolyte that separates two electrode chambers and an insulator that electrically isolates the two electrode chambers. Aspects of embodiments according to the present invention are further directed toward when the solid electrolyte includes $\beta$-alumina or $\beta''$-alumina and the insulator includes $\alpha$-alumina (and thus, the two structures may have different thermal expansion coefficients), and to solid electrolytes and methods of manufacturing the same that may reduce or prevent defects at the joint region between solid electrolytes and insulators with these material compositions. Aspects of embodiments according to the present invention are still further directed toward addressing joint region defects related to differences in thermal expansion coefficients of $\beta$-alumina based solid electrolytes and $\alpha$-alumina based insulators by gradually increasing the concentration of $\alpha$-alumina and gradually decreasing the concentration of $\beta$-alumina (or $\beta''$-alumina) in the solid electrolyte in a direction towards the joint region.

In accordance with an exemplary embodiment of the present invention, a solid electrolyte is disclosed. The solid electrolyte has a main portion that includes $\beta$-alumina or $\beta''$-alumina, and an edge portion integrally provided with the main portion. The edge portion has a mixed portion that includes $\alpha$-alumina and includes $\beta$-alumina or $\beta''$-alumina. A concentration gradient of the $\alpha$-alumina in the edge portion decreases in a first direction from the edge portion to the main portion.

A concentration gradient of the $\beta$-alumina or $\beta''$-alumina in the edge portion may gradually decrease in a second direction from the main portion to the edge portion. The concentration gradient of the $\alpha$-alumina in the edge portion may gradually increase in the second direction.

The edge portion may be configured to be joined to an insulator via a glass frit.

The insulator may include $\alpha$-alumina. The edge portion may have a portion having substantially identical thermal expansion coefficient as that of the insulator.

The edge portion may be integrally sintered with the main portion.

In accordance with another exemplary embodiment of the present invention, an electrochemical cell is provided. The electrochemical cell includes a housing, a first electrode chamber inside the housing, a second electrode chamber inside the housing, an insulator electrically isolating the first electrode chamber from the second electrode chamber, and a solid electrolyte between the first electrode chamber and the second electrode chamber. The solid electrolyte has a main portion that includes $\beta$-alumina or $\beta''$-alumina, and an edge portion integrally provided with the main portion. The edge portion has a mixed portion that includes $\alpha$-alumina and includes $\beta$-alumina or $\beta''$-alumina. A concentration gradient of the $\alpha$-alumina in the edge portion decreases in a first direction from the edge portion to the main portion. The edge portion is between the main portion and the insulator.

A concentration gradient of the $\beta$-alumina or $\beta''$-alumina in the edge portion may gradually decrease in a second direction from the main portion to the edge portion. The concentration gradient of the $\alpha$-alumina in the edge portion may gradually increase in the second direction.

The edge portion may be joined to the insulator via an adhesive substance.

The adhesive substance may include a glass frit.

The insulator may include $\alpha$-alumina. The edge portion may have a portion having a substantially identical thermal expansion coefficient as that of the insulator.

The edge portion may be integrally sintered with the main portion.

In accordance with yet another exemplary embodiment according to the present invention, a method of manufacturing a solid electrolyte is provided. The method includes forming a main portion of the solid electrolyte from a $\beta$-alumina based material that includes $\beta$-alumina or $\beta''$-alumina as a main component, forming an edge portion on the main portion of the solid electrolyte from an $\alpha$-alumina based material that includes $\alpha$-alumina as a main component (to form a boundary between the edge portion and the main portion), and sintering the main portion and the edge portion at a first temperature to remove the boundary between the main portion and the edge portion.

The $\beta$-alumina based material may be in a powdered state. The forming of the main portion may include applying pressure to the powdered $\beta$-alumina based material to form a shape of the solid electrolyte.

The $\alpha$-alumina based material may be in a paste form that includes $\alpha$-alumina paste. The forming of the edge portion may include coating the $\alpha$-alumina paste on a region of the main portion corresponding to the boundary between the main portion and the edge portion.

The forming of the edge portion may further include drying the $\alpha$-alumina paste.

DESCRIPTION OF CERTAIN ELEMENTS OF THE DRAWINGS

Figure 1:
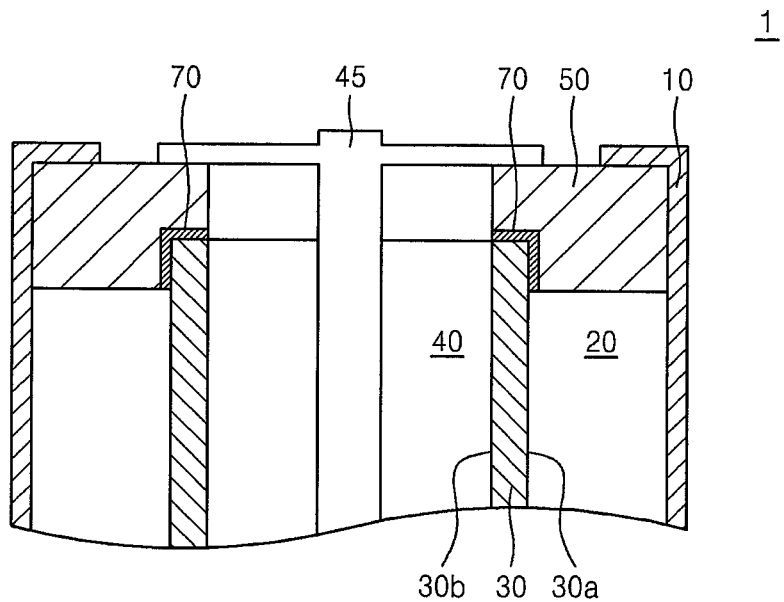
FIG. 1 is a schematic and vertical sectional view of an electrochemical cell according to an embodiment of the present invention.

| 1: electrochemical cell | 10: housing |
| 20: first electrode chamber | 30, 60: solid electrolytes |
| 61: β″-alumina | 62: α-alumina |
| 40: second electrode chamber | 45: cathode current collector |
| 50: insulator | 70: glass frit |

DETAILED DESCRIPTION

Aspects and characteristics of the present invention, and methods for accomplishing them, may be apparent in view of embodiments described in more detail herein with reference to the attached drawings. However, the present invention is not limited to the following embodiments, and may have different forms. The present invention should not be construed as being limited to the descriptions set forth herein. While this invention has been particularly shown and described with reference to embodiments thereof, it will be understood by those skilled in the art that various changes in form and details may be made therein without departing from the spirit and scope of the invention as defined by the appended claims.

The terminology used herein is for describing particular embodiments and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated elements, steps, operations, and/or devices, but do not preclude the presence or addition of one or more other elements, steps, operations, and/or devices. It will also be understood that although the terms first, second, etc. may be used herein to describe various elements, these elements should not be limited by these terms. These terms are only used to distinguish one element from another. Hereinafter, for ease of understanding, like elements are denoted by like reference numerals.

FIG. 1 is a schematic and vertical sectional view of an electrochemical cell 1 according to an embodiment of the present invention.

Referring to FIG. 1, the electrochemical cell 1 includes a housing 10, a solid electrolyte 30 for dividing an inner portion of the housing 10 into a first electrode chamber 20 and a second electrode chamber 40, and an insulator 50 jointed to the solid electrolyte 30. In the electrochemical cell 1 of FIG. 1 and according to one embodiment, the first electrode chamber 20 is an anode chamber and includes an anode material. The anode material may be an alkali metal such as sodium. In this case, the sodium may be dissolved and thus present in a liquid phase. Besides sodium, the anode material may also be any other alkali metal such as lithium or potassium.

In addition, in the electrochemical cell 1 of FIG. 1 and according to one embodiment, the second electrode chamber 40 is a cathode chamber and includes a cathode material. The cathode material may include Ni, Fe, $NiCl_2$, S, and/or FeS. The second electrode chamber 40 may further include a liquid electrolyte such as $NaAlCl_4$.

A cathode current collector may be located in the cathode chamber. For example, in the electrochemical cell 1 of FIG. 1, cathode current collector 45 is located in the second electrode (cathode) chamber 40.

In the electrochemical cell 1 of FIG. 1 and according to one embodiment, the first electrode chamber 20 is the anode chamber, and the second electrode chamber 40 is the cathode chamber. However, the present invention is not limited thereto. For example, in other embodiments, the first electrode chamber 20 may be the cathode chamber, and the second electrode chamber 40 may be the anode chamber.

The solid electrolyte 30 may allow ions to flow therethrough. Alkali ions that are generated during charging and discharging, for example, sodium ions may flow from the first electrode chamber 20 to the second electrode chamber 40 through the solid electrolyte 30, or from the second electrode chamber 40 to the first electrode chamber 20 through the solid electrolyte 30. The solid electrolyte 30 may have a tube-shape having an open side and may be disposed inside the housing 10.

The solid electrolyte 30 may include a β-alumina based material. For example, the solid electrolyte 30 may include β-alumina or β″-alumina as a main component. A portion (for example, a mixed portion) of the solid electrolyte 30 may include α-alumina. For example, the solid electrolyte 30 may overall include β-alumina or β″-alumina, and a portion of the solid electrolyte 30 that is joined to the insulator 50 via a glass frit 70 may include α-alumina as a main component.

The insulator 50 may electrically insulate the first electrode chamber 20 from the second electrode chamber 40. The insulator 50 may be joined to a side of the solid electrolyte 30 via an adhesive material, for example, the glass frit 70. The insulator 50 may include α-alumina.

In the present embodiment, the insulator 50 may be joined to an outer surface 30a via the glass frit 70. However, the present invention is not limited thereto. For example, the insulator 50 may be joined to an inner surface 30b of the solid electrolyte 30 via the glass frit 70.

Figure 2:
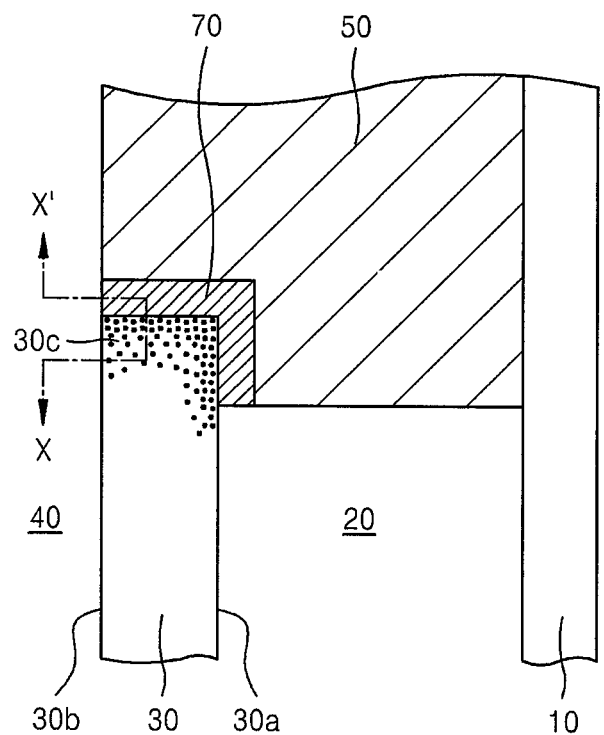
FIG. 2 is a cross-sectional view for illustrating a joint state between a solid electrolyte and an insulator in the electrochemical cell of FIG. 1.
Figure 3:
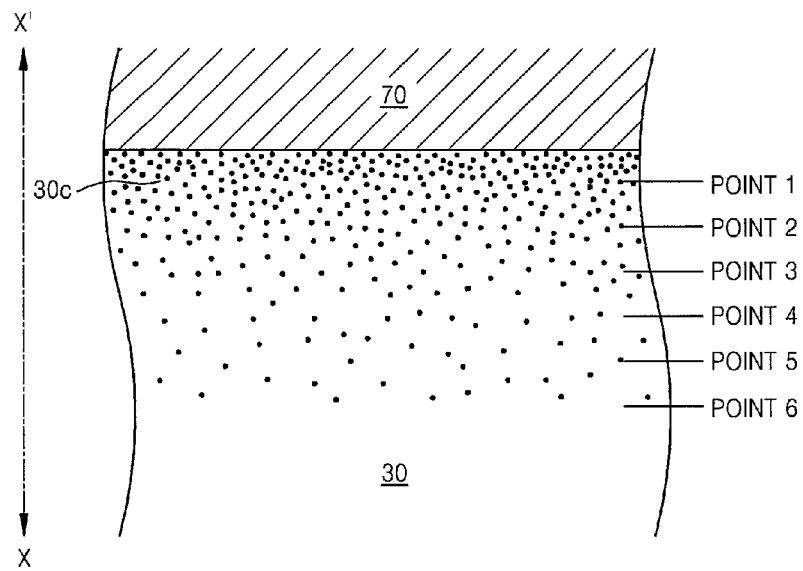
FIG. 3 is an enlarged view of an upper portion of the solid electrolyte of FIG. 2 taken along the line X-X'.

FIG. 2 is a cross-sectional view for illustrating a joint state between the solid electrolyte 30 and the insulator 50 in the electrochemical cell 1 of FIG. 1. FIG. 3 is an enlarged view of an upper portion of the solid electrolyte 30 of FIG. 2 taken along the line X-X'.

Referring to FIGS. 2 and 3, the solid electrolyte 30 is joined to the insulator 50 via the glass frit 70. The solid electrolyte 30 may overall include a β-alumina based material, and a portion 30c (for example, an edge portion 30c) of the solid electrolyte 30 that contacts the glass frit 70 may include α-alumina. In this case, α-alumina is sintered together with β-alumina or β″-alumina (that is, integrally sintered) and thus, a distinct boundary between α-alumina and β-alumina or β″-alumina may disappear after sintering.

In a direction toward X', the amount of α-alumina increases, and the amount of β″-alumina (or β-alumina) decreases (that is, the α-alumina concentration gradient increases, and the β″-alumina (or β-alumina) concentration gradient decreases). By contrast, in a direction toward X, the amount of β″-alumina or β-alumina increases, and the amount of α-alumina decreases (that is, the α-alumina concentration gradient decreases, and the β"-alumina (or β-alumina) concentration gradient increases). This can be confirmed by referring to the graph of FIG. 4.

Figure 4:
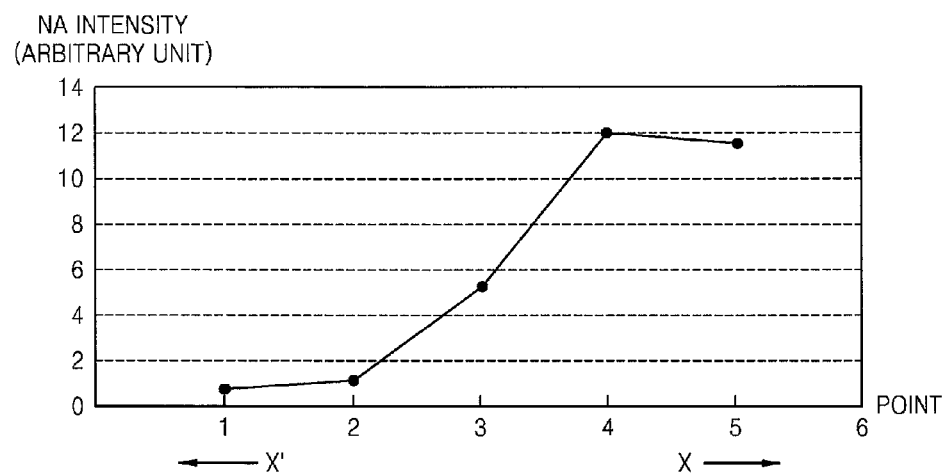
FIG. 4 is a graph of sodium (Na) amount according to location in the solid electrolyte illustrated in FIG. 3.

FIG. 4 is a graph of sodium (Na) amount according to location in the solid electrolyte 30 illustrated in FIG. 3. In an exemplary embodiment of the present invention, the solid electrolyte 30 including β"-alumina as a major component and having an upper portion coated with α-alumina was sintered. Then, the amount of sodium in the solid electrolyte 30 was measured according to location.

Referring to FIG. 4, the amount of sodium decreases significantly from point 5 and point 4 to point 3, and from point 3 to point 2 and point 1. In general, the amount of sodium in α-alumina is negligible or almost zero compared to the amount of sodium in β"-alumina. Accordingly, the amount of sodium in the solid electrolyte 30 according to the present embodiment differs according to location. Based on the amount of sodium, a material state at the respective points will be described in more detail.

An increase in the amount of sodium indicates that the amount of β"-alumina increases and the amount of α-alumina decreases. Accordingly, it can be confirmed that at points 4 and 5, a large quantity of β"-alumina is present. It can also be confirmed that in an area between point 4 and point 2, β"-alumina and α-alumina coexist and the amount of α-alumina gradually increases in a direction toward an edge portion 30c of the solid electrolyte 30 (for example, in the direction toward X'). In addition, at point 1, a large quantity of α-alumina is present.

A β-alumina based material (for example, β"-alumina) has a thermal expansion coefficient of about 1.2 to 3.4 $10^{-6}/°C$. Due to this wide thermal expansion range, when a solid electrolyte containing a β-alumina based material is joined to an insulator via glass frit, it is likely to produce a defective cell, and stability of the cell is substantially decreased during driving. However, the solid electrolyte 30 according to the embodiment of FIGS. 1-4 as described above has the increasing amount of α-alumina in the direction toward the edge portion 30c of the solid electrolyte 30 and thus, the thermal expansion coefficient of the edge portion 30c of the solid electrolyte 30 may be similar or substantially identical to the thermal expansion coefficient of the insulator 50 (that includes α-alumina). Accordingly, when the solid electrolyte 30 is joined to the insulator 50 via the glass frit 70, a joint defect between the solid electrolyte 30 and the insulator 50 caused by different thermal expansion coefficients may be effectively prevented or its likelihood substantially reduced. Such a joint defect may, for example, cause leakage of an electrode material in the electrochemical cell.

In general, an electrochemical cell is driven at high temperature of about 300° C. In this case, if the solid electrolyte 30 and the insulator 50 which are jointed to each other via the glass frit 70 have different thermal expansion coefficients, the joint state may deteriorate in consideration of the long lifetime (life span) of an electrochemical cell. However, according to an embodiment of the present invention, the solid electrolyte 30 (or more particularly, an edge portion 30c of the solid electrolyte 30 that contacts the glass frit 70) and the insulator 50 that are located on opposite sides of the glass frit 70 have substantially the same thermal expansion coefficient. Accordingly, the joint defect caused by different thermal expansion coefficients may be prevented or its likelihood substantially reduced.

In addition, since α-alumina included in the solid electrolyte 30 is combined with β"-alumina or β-alumina by sintering, α-alumina may not be separated from β"-alumina or β-alumina for a long time period.

An electrochemical cell according to an embodiment of the present invention may have a vertical tube shape. An electrochemical cell according to another embodiment of the present invention may have a panel-shape such that a first electrode chamber and a second electrode chamber are disposed in opposite directions (for example, on opposite sides) of a panel-shaped solid electrolyte. Also, the electrochemical cell according to the present invention may have any other suitable shape as long as a solid electrolyte includes β-alumina based material and a portion of the solid electrolyte that is jointed to an insulator via glass frit includes α-alumina that is also included in the insulator 50 in which the α-alumina is sintered.

Figure 5:
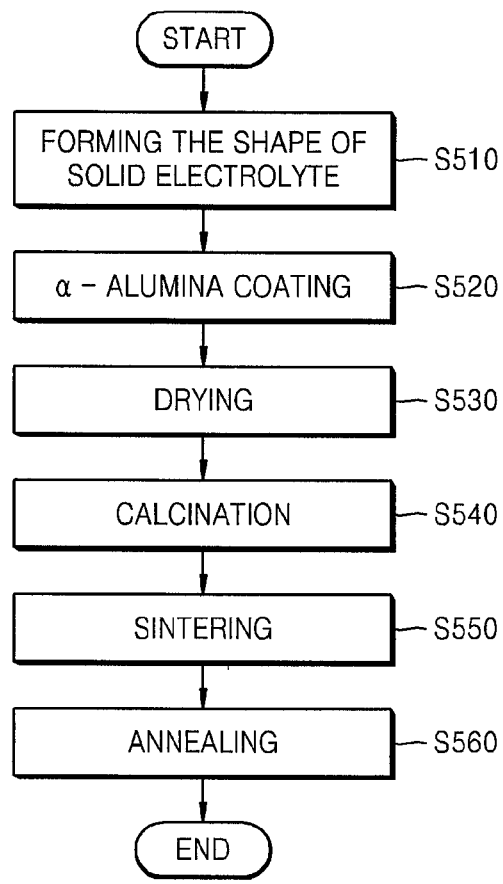
FIG. 5 is a flowchart for illustrating a method of manufacturing a solid electrolyte of an electrochemical cell according to an embodiment of the present invention.

FIG. 5 is a flowchart for illustrating a method of manufacturing a solid electrolyte of an electrochemical cell according to an exemplary embodiment of the present invention (for example, the solid electrolyte 30 of the electrochemical cell 1 of FIG. 1). FIGS. 6 through 9 are cross-sectional views of the solid electrolyte 30 after the completion of different steps of the method of FIG. 5. For ease of description, only a portion of a solid electrolyte is illustrated and a thickness thereof is exaggerated for clarity.

① Operation 510

In operation 510, a structure is formed using a β-alumina based material. For example, pressure is applied to a β-alumina based material in a powder state including β"-alumina or β-alumina to form the shape of a solid electrolyte. For example, the applied pressure to the powdered β-alumina based material may be (in a range) at 1500 kgf/cm² or 2500 kgf/cm² (or between 1500 kgf/cm² and 2500 kgf/cm²).

Figure 6:
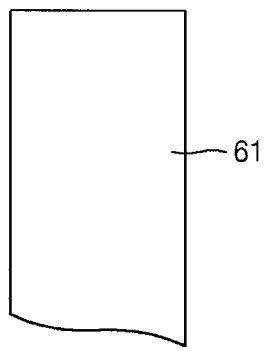
FIGS. 6 through 9 are cross-sectional views of the solid electrolyte after the completion of different steps of the method of FIG. 5.

The structure formed by pressure may have a cylindrical tube shape having a bottom surface and an open side, or an even panel shape. FIG. 6 is a view of a side of the structure formed of β"-alumina 61.

② Operation 520

Figure 7:
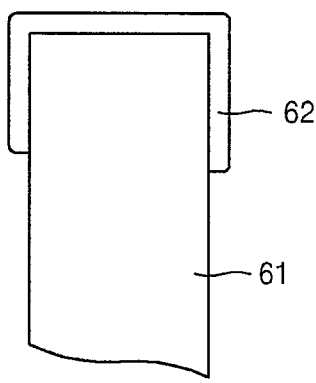

In operation 520, an end portion of the structure of a solid electrolyte is coated with α-alumina 62. Referring to FIG. 7, the α-alumina 62 is in a paste form (that is, α-alumina paste) and may be coated on the end portion of the β"-alumina structure 61, thus forming a boundary between the β"-alumina 61 and the α-alumina 62. The α-alumina 62 may be coated to a thickness of about 30 μm to 5 mm in consideration of characteristics of α-alumina and a relationship between the glass frit 70 and the insulator 50.

The thickness of the α-alumina 62 in this operation may be reduced after a sintering process in operation 550 that will be described later. That is, due to the sintering in operation 550, a distinct boundary between the α-alumina 62 and the β"-alumina 61 disappears. Thus, it needs to be considered that due to operation 550, the α-alumina 62 coated in this operation may include an area (for example, an edge portion) in which the α-alumina 62 and the β"-alumina 61 coexist.

In this operation, if the thickness of the α-alumina 62 coated is less than 30 μm, a thickness of a portion that predominantly includes the α-alumina 62 formed from the sintering in operation 550 decreases. Thus, thermal expansion of the α-alumina 62 may not be enough to prevent excessive joint defects. In this operation, if the thickness of the α-alumina 62 coated is less than 30 μm, the α-alumina 62 included in the end portion of the solid electrolyte 60 may have no or little effect when the insulator 50 is joined to the solid electrolyte 60 after the sintering. That is, such a thin coating of α-alumina 62 may result in leakage of an electrode material occurring due to different thermal expansion coefficients of the solid electrolyte 60 and the insulator 50.

③ Operation 530

Figure 8:
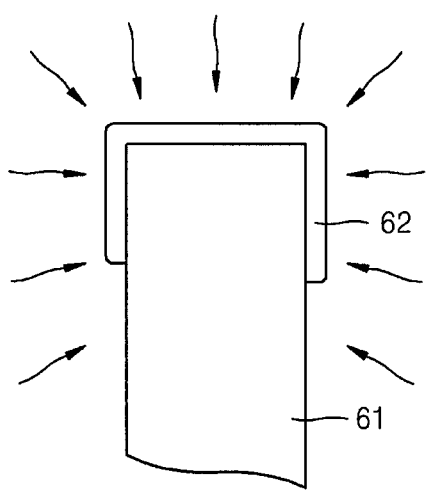

FIG. 8 illustrates various heat-applying techniques, such as drying, calcining, and sintering, being applied to the structure formed of β"-alumina 61 and α-alumina 62. In operation 530, the α-alumina 62 is dried. For example, the drying may be performed at a temperature of about 120 to 200° C. for about 30 to 60 minutes. The drying time and the drying temperature may differ according to the coating thickness and components of the α-alumina 62.

④ Operation 540

In operation 540, the structure coated with the α-alumina 62 is calcined. For example, the calcination may be performed at a temperature of about 1200 to 1300° C. for about 10 hours to about 13 hours to burn unnecessary components. Due to the calcination, stress and cracking may be prevented. The calcination temperature may be obtained by increasing the temperature in phases.

⑤ Operation 550

In operation 550, the structure coated with the α-alumina 62 is sintered. Referring to FIG. 8, the sintering may be performed at a temperature of about 1500 to 1700° C. for about 1 hour to 3 hours. For example, in order to minimize thermal impact, the temperature may be increased with a temperature increase rate of 10° C. per minute to reach the sintering temperature of about 1500 to 1700° C. Due to the sintering, a distinct boundary between the α-alumina 61 and the β"-alumina 62 may disappear, and the amount of the α-alumina 61 increases in a direction toward an edge of the structure.

⑥ Operation 560

Figure 9:
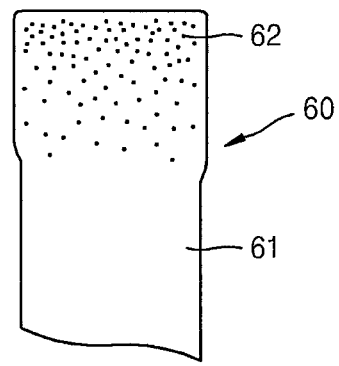

In operation 560, after the sintering, annealing is performed by slowly decreasing the temperature. Referring to FIG. 9, the α-alumina 62 and the β"-alumina 61 of the solid electrolyte 60 are stabilized by annealing.

A solid electrolyte manufactured according to an embodiment of the present invention as described above is spaced apart from an insulator by glass frit and has substantially the same thermal expansion coefficient as the insulator. Accordingly, leakage of an electrode material of an electrochemical cell may be prevented or reduced and the lifetime (life span) of an electrochemical cell that includes such a solid electrolyte may be increased.

Figure 10:
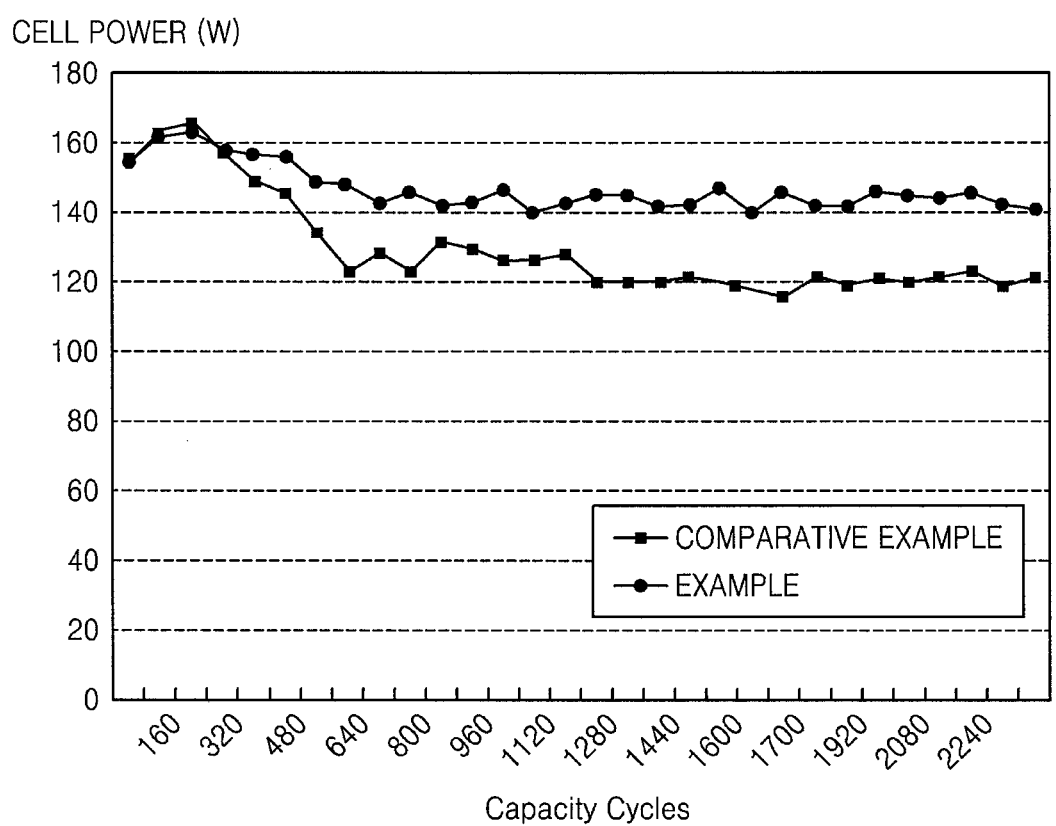
FIG. 10 is a graph of cell power with respect to a charge and discharge cycle of an electrochemical cell according to an embodiment of the present invention.

FIG. 10 is a graph of cell power with respect to a charge and discharge cycle of an electrochemical cell according to an embodiment of the present invention.

An electrochemical cell according to an embodiment of the present invention includes an insulator including α-alumina, glass frit including $SiO_2.B_2O_3.R_2O$ (ASF102X, Asahi Glass) where R is an alkali metal, and a solid electrolyte having an end (for example, an edge portion) including α-alumina. In this case, the solid electrolyte may overall include β"-alumina as a major component and an end portion of the solid electrolyte that is jointed to the insulator includes α-alumina.

Meanwhile, as a comparative example, an electrochemical cell including an insulator including α-alumina, glass frit including $SiO_2.B_2O_3.R_2O$ (ASF102X, Asahi Glass) where R is an alkali metal, and a solid electrolyte having β"-alumina is used. In the comparative electrochemical cell, an end portion of the solid electrolyte that is jointed to the insulator does not include α-alumina.

A solid electrolyte according to an embodiment of the present invention used to obtain the charge and discharge cycle test results shown in FIG. 10 is manufactured by performing operations 510 through 560 described above. For example, the structure is formed using β"-alumina (operation 510), α-alumina is coated to a thickness at 80 μm or 100 μm, or between 80 μm and 100 μm (operation 520), and the α-alumina is dried at a temperature of about 200° C. for 30 minutes (operation 530). Then, calcination is performed at a temperature of about 1230 to 1260° C. for about 12 hours (operation 540), sintering is performed at a temperature of about 1550° C. to 1620° C. for about 90 minutes (operation 550). Finally, annealing is performed (operation 560), thereby completing manufacturing a solid electrolyte including α-alumina and β"-alumina.

Referring to FIG. 10, the electrochemical cell according to an embodiment of the present invention has a constant cell power of about 140 W to about 160 W. Even when the number of charge and discharge cycles increases, cell power does not decrease below 140 W according to the data in FIG. 10.

On the other hand, power of the comparative electrochemical cell substantially decreases immediately after 320 charge and discharge cycles. The overall power of the comparative electrochemical cell settles to about 120 W, and is about 20 W lower than the electrochemical cell according to an embodiment of the present invention.

The electrochemical cell described above may have any suitable shape as long as the solid electrolyte 30 is jointed to the insulator 50. For example, the electrochemical cell may have a cylinder-shape or a panel-shape.

It should be understood that the exemplary embodiments described herein should be considered in a descriptive sense only and not for purposes of limitation. Descriptions of features or aspects within each embodiment should be considered as available for other similar features or aspects in other embodiments. Accordingly, it will be understood by those of ordinary skill in the art that various changes in form and details may be made without departing from the spirit and scope of the present invention as set forth in the following claims, and equivalents thereof.

What is claimed is:

1. An insulated solid electrolyte comprising:
   a main portion comprising β-alumina or β"-alumina;
   an edge portion comprising α-alumina and integrally provided with the main portion, the edge portion having a mixed portion comprising α-alumina and comprising β-alumina or β"-alumina, the edge portion having no distinct boundary between α-alumina and β alumina or β"-alumina; and
   an insulator surrounding the mixed portion and configured to electrically isolate different electrode chambers on different sides of the main portion,
   wherein a concentration gradient of the α-alumina in the edge portion decreases in a first direction from the edge portion to the main portion, and
   the insulator is joined to the edge portion via an adhesive substance.

2. The solid electrolyte of claim 1, wherein
   a concentration gradient of the β-alumina or β"-alumina in the edge portion gradually decreases in a second direction from the main portion to the edge portion, and
   the concentration gradient of the α-alumina in the edge portion gradually increases in the second direction.

3. The solid electrolyte of claim 1, wherein the edge portion is joined to the insulator via glass frit.

4. The solid electrolyte of claim 1, wherein
   the insulator comprises α-alumina, and
   the edge portion has a portion having a substantially identical thermal expansion coefficient as that of the insulator.

5. The solid electrolyte of claim 1, wherein the edge portion is integrally sintered with the main portion.

6. An electrochemical cell comprising:
a housing;
a first electrode chamber inside the housing;
a second electrode chamber inside the housing;
a solid electrolyte between the first electrode chamber and the second electrode chamber, the solid electrolyte having:
  a main portion comprising β-alumina or β"-alumina; and
  an edge portion comprising α-alumina and integrally provided with the main portion, the edge portion having a mixed portion comprising α-alumina and comprising β-alumina or β"-alumina, the edge portion having no distinct boundary between α-alumina and β alumina or β"-alumina; and
an insulator surrounding the mixed portion and electrically isolating the first electrode chamber from the second electrode chamber,
wherein a concentration gradient of the α-alumina in the edge portion decreases in a first direction from the edge portion to the main portion, and
wherein the edge portion is between the main portion and the insulator, and is joined to the insulator via an adhesive substance.

7. The electrochemical cell of claim 6, wherein
a concentration gradient of the β-alumina or β"-alumina in the edge portion gradually decreases in a second direction from the main portion to the edge portion, and
the concentration gradient of the α-alumina in the edge portion gradually increases in the second direction.

8. The electrochemical cell of claim 6, wherein the adhesive substance comprises a glass frit.

9. The electrochemical cell of claim 6, wherein
the insulator comprises α-alumina, and
the edge portion has a portion having a substantially identical thermal expansion coefficient as that of the insulator.

10. The electrochemical cell of claim 6, wherein the edge portion is integrally sintered with the main portion.

* * * * *